United States Patent [19]

Föhl

[11] 4,392,671

[45] Jul. 12, 1983

[54] SECURING DEVICE FOR THE SAFETY BELT OF A RESTRAINING SYSTEM

[75] Inventor: Artur Föhl, Schorndorf, Fed. Rep. of Germany

[73] Assignee: Repa Feinstanzwerk GmbH, Alfdorf, Fed. Rep. of Germany

[21] Appl. No.: 223,427

[22] Filed: Jan. 8, 1981

[30] Foreign Application Priority Data

Jan. 14, 1980 [DE] Fed. Rep. of Germany ....... 3001090

[51] Int. Cl.³ ............................................. B60R 21/00
[52] U.S. Cl. .................................. 280/802; 280/804; 297/480
[58] Field of Search .............. 280/802, 804, 806, 808; 297/469, 476, 478, 479, 480

[56] References Cited

U.S. PATENT DOCUMENTS 4,290,629  9/1981  Ueda .................................... 280/806
4,302,031  11/1981  Nishimura .......................... 280/804

FOREIGN PATENT DOCUMENTS 2714340  5/1978  Fed. Rep. of Germany ...... 297/480

Primary Examiner—Joseph F. Peters, Jr.
Assistant Examiner—John A. Carroll
Attorney, Agent, or Firm—Herbert L. Lerner; Laurence A. Greenberg

[57] ABSTRACT

Restraining system, especially a passive restraining system, for motor vehicles wherein one end of the belt is slideable in a slider track, preferably arranged above the vehicle door, and can be locked at the end of the track behind a securing element which extends into the slider track. An inertial mass sensor activated when an acceleration or tilting force exceeds a predetermined value, results in movement of the inertial mass in the direct path of the movable securing element causing blocking of its movement and retaining it in locked position to lock the belt end.

7 Claims, 5 Drawing Figures

SECURING DEVICE FOR THE SAFETY BELT OF A RESTRAINING SYSTEM

BACKGROUND OF THE INVENTION

1. Field of the Invention

The invention relates to a securing device for the safety belt of a restraining system for motor vehicles, especially for a passive restraining system, wherein one end of the belt is slideable in a slider track, preferably arranged above the vehicle door, and can be locked at the end of the track behind a securing element, movable against a spring force, which securing element extends into the slider track and can be locked by an inertial mass type sensor.

2. Description of the Prior Art

In a known passive-restraining belt system a slider track in the form of a rail is arranged above the door of a vehicle. The track has a vertical section at the center post of the vehicle. The belt which is attached to a stiff end-part can slide along this slider track. In this manner one obtains a movable shoulder point of the belt, and thereby greater ease in entering a car with a restraining system of this type. The mentioned end-part can be moved in a direction toward the front side of the vehicle to permit the person using the safety device to enter the car, while in the safety position, the end-part is secured with respect to pull-forces in the vertical section of the slider track. A locking hook is provided for the actual locking of the mentioned end-part. The locking hook extends into the slider track, and is movable against a spring force by the end-part itself, thereby disposing the end part behind said hook. At the occurrence of tilting forces which exceed a predetermined measure, this hook is locked indirectly by a mass sensor through a force-transmitting lever which is arranged between the mass sensor and the hook, so that the belt cannot move out of the safety position along the slider track. The functional reliability of such a system can be reduced or clearly endangered, if the acceleration of the inertial mass element of the sensor is not sufficient to move the transmitting lever into the lock position, especially when the bearing condition of the transmitting lever has changed, for example, by collected dirt, wear, or the like.

SUMMARY OF THE INVENTION

An object of the present invention is to provide a restraining system of the initially mentioned type improved with respect to its functional reliability.

With the foregoing and other objects in view, there is provided in accordance with the invention a restraining system for motor vehicles, especially a passive restraining system, with a safety belt and a securing device for the safety belt, comprising a seat belt for restraining a person in a seat of the vehicle, a slider track disposed in the vehicle with one end of said seat belt slideable in the slider track, a movable securing element for locking said one end of the seat belt at the end of the track, spring means with a force sufficient to urge said movable securing element in the path of the belt end in the slider track but of insufficient force to prevent the belt end from sliding into and away from the end of the track, and inertial mass sensor in which the inertial mass is activated at the occurrence of an acceleration or a tilting force which exceeds a predetermined value, said activation being movement of said inertial mass in the direct path of movement of said movable securing element to block movement of the securing element retaining it in locked position to lock said belt end.

Other features which are considered as characteristic for the invention are set forth in the appended claims.

Although the invention is illustrated and described herein as embodied in a securing device for the safety belt of a restraining system, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
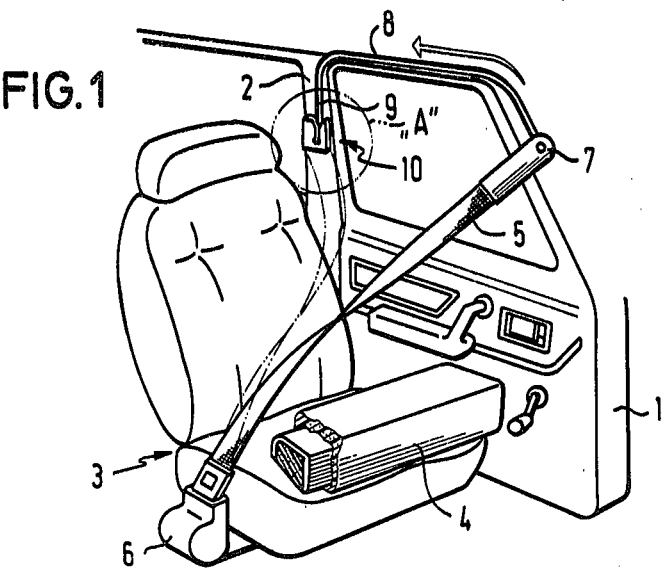
FIG. 1 is a partial view, shown in perspective, of the inside space of a vehicle with a built-in safety system particularly illustrating a slider track above the door with an end part of the belt in the track and the safety device circled and designated "A"

In accordance with the invention the mass element of the inertial mass sensor falls directly into the locking path of the securing element, at the occurrence of acceleration or tilting forces exceeding a predetermined measure. In the present invention, the inertial mass does not move a mechanical element into the locking position. Here, the inertial mass follows the forces occurring when activated, i.e. for example when the vehicle is tilting, and the inertial body itself directly provides a stop for the securing element, for example, for a swing-lever. In this manner, the functional reliability of the securing device, according to the invention, is not dependent anymore on the more or less favorable bearing conditions of transmitting elements, and therefore practically insensitive to dirt and wear.

According to a further development of the invention, the securing element which is constructed in the form of a hinged swing lever against which a spring exerts a force, is provided with a blocking projection which is in direct connection with a ball sensor. Preferably, the swing lever is two-armed with preferably a plate-like blocking projection which extends with its surface above a sensor housing which is open toward the blocking projection. Approximately in the center of the housing is a hole for the rest position of the sensor ball. All around the hole is provided a running surface on which the sensor ball rolls when the sensor is activated, and the ball blocks the path of the swinging lever. Whenever the vehicle gets in an oblique position and also when the acceleration of the vehicle exceeds a certain value, the sensor ball leaves its rest position in the middle, and moves into the locking position. Thus, the sensor ball can follow practically any force direction, because the rest position is surrounded on all sides by the running surface.

Further advantageous details of the invention will become clear from the typical embodiment shown in the drawings and explained in the following.

FIG. 1 shows a passive restraining system for the driver's seat in a motor vehicle, in which the vehicle door is designated 1, the center post 2 of the vehicle frame, and the driver's seat 3. A strong, built-in restraining support is marked 4. A belt 5 is fastened at one side at the vehicle floor, for example, by means of an automatic roll-up device 6, and is provided at the other belt end with a stiff end-part 7, which is supported in a slider-track 8 formed by a long rail with a longitudinal groove, and can slide into an open position shown by solid lines in FIG. 1 to make it easier to get into the car. The belt can slide to a safety position indicated by dotted lines by moving the end-part 7 in a vertical section 9 of the slider-track at the center post 2. The horizontal section of the slider track 8 runs above the vehicle door 1, and is slightly bent toward the front side of the vehicle. The shoulder point of the belt 5 is, therefore, movable to make it more comfortable to get into the car. In the safety position, the end part 7 engages at the vertical section 9 in a safety device which is shown in more detail in FIGS. 2 and 3 and which is generally designated with 10.

Figure 3:
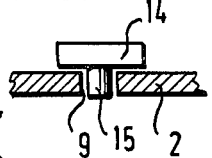
FIG. 3 is an enlargement of glider track in the center post to show the support plate and pin in a view in the direction of arrow X according to FIG. 2.
Figure 2:
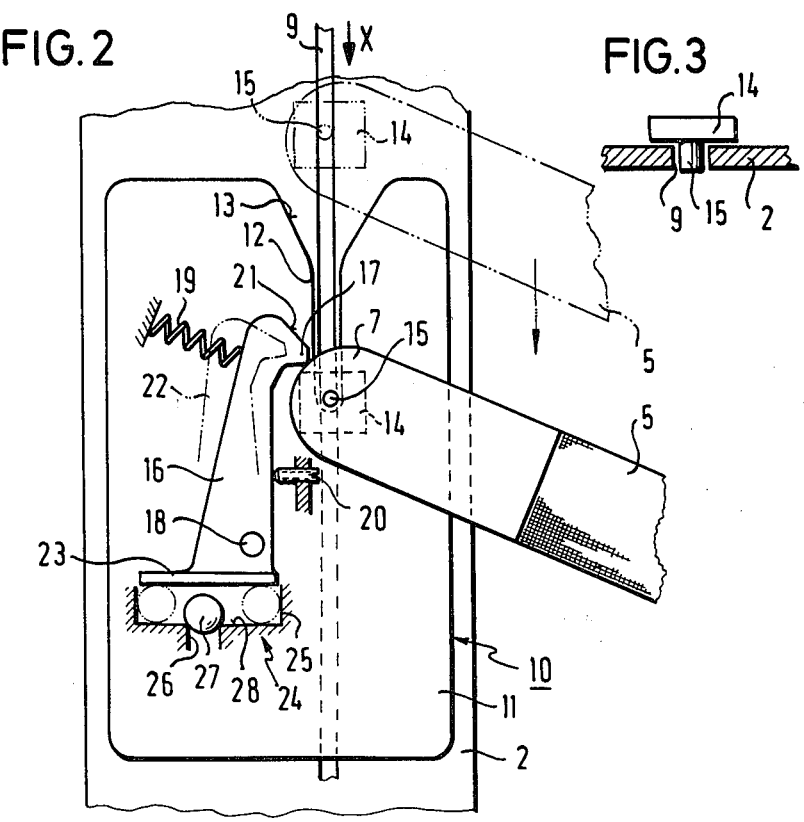
FIG. 2 is an enlarged plan view showing in greater detail "A" of FIG. 1.

The carrying part of the safety device 10 is a plate- or box-like bracket 11 which is secured at the center post 2. The bracket 11 has an insertion groove 12 which is aligned with the slider track 9, and is also provided with a funnel-shaped expanded insertion opening 13. The stiff, semicircular end part 7 to which the belt end is fastened, as shown in FIG. 3, has a small support plate 14 as retainer, which is, for example, hingeably connected with the end part 7 by a bar or a pin 15. The pin 15 is guided in the slider track 9 in the form of a longitudinal groove at the center post 2. A securing element 16 constructed in the form of a two-armed swing lever is provided with a latching hook 17, and pivots around an axis 18. The securing element 16 is pressed by a spring 19 against a stop 20, preferably adjustable, in which position the latching hook 17 reaches into the motion path of the end part 7, as shown in FIG. 2. The latching hook 17 is provided with a lead-in chamfer 21, by means of which the securing element 16 is moved by the rounded contour of the end part 7 into the open position 22, indicated by dotted lines, when the end part 7 is moved, and thereafter is locked behind the returning latching hook 17. In reverse, the end part 7 can be released from the arrested position, simply by sliding it up whereby the end part 7 moves the securing element 16 into the open position against the force of spring 19. The securing element 16 is provided at the other lever arm, on the side opposite to the latching hook 17, with a plate-like blocking projection 23, for example, in the form of a round disc which works directly in conjunction with an acceleration sensor with a ball (ball sensor) designated generally by numeral 24. The acceleration sensor 24 has a housing 25 which is round in the plan view, and open toward the top, with a hole 26 in the middle in which the sensor-ball 27 rests in the non-activated position of the ball sensor 24. The housing 27 is surrounded on all sides by an essentially flat, slightly inclined running surface 28. In the non-activated position, the sensor-ball 27 is disposed somewhat below the running surface 28 in the hole 26, so that the securing element 16 can swing freely. If, for example, in case of a crash or when the vehicle is tilting, acceleration- or tilting forces exceeding a predetermined value are acting on the vehicle, and thereby on the ball sensor, the sensor-ball 27 moves onto the running surface 28, and there forms a stop for the blocking projection 23 of the securing element 16, so that the latter is automatically locked in the safety position. With element 16 locked, the end part 7 of the belt 5 also becomes locked, and cannot be moved away from safety- or arrested position by forces acting along the slider track 9. In FIG. 2, dotted outlines of the ball indicate that the sensor-ball 27 can move in different directions from the rest position, with the consequence that it locks the safety element 16 in any position on the running surface 28.

Figure 3A:
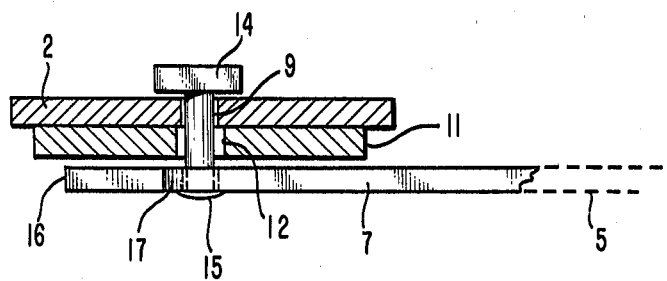
FIG. 3a is an enlargement of the gilder track in greater detail to show the relationship of the bracket 11 secured to the center post as well as the insertion groove 12 and also to the end part 7.
Figure 2A:
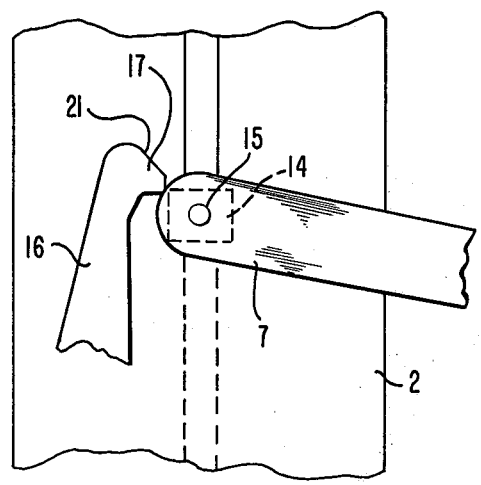
FIG. 2a is a simplified plan view to illustrate the locking function between latching hook 17 and end part 7.

As can be seen from FIG. 3a and FIG. 2, the end part 7 to which the belt 5 is secured is blocked and arrested by the latching tool 17 of the securing element 16 by the latching hook 17 bearing on the semi-circular peripheral edge of part 7. In this position, after triggering the ball sensor 24, the securing element 16 itself is locked, and cannot return to the dash-dotted position shown in FIG. 2. The end part 7 is supported on a pin 15, and connected by this pin 15 with the small support plate 14. Pin 15 is slidable being guided longitudinally in the slider track 9 of the center post 2, and in the insertion groove 12 of the bracket 11. Bracket 11 is in fixed connection with the center post 2 of the motor vehicle. As the end part 7 is moved into the blocking position according to FIG. 2 or 2a, its semi-circular edge moves against the lead-in chamfer 21 of the latching hook 17, and shoves the securing element 16 away against the force of spring 19, into the position shown with dash-dot lines in FIG. 2. As the end part 7 continues its movement, the latching hook 17 then engages at the peripheral edge of end part 7, with the result that the end part 7 cannot be moved upward as the securing element 16 is locked by ball 27.

I claim:

1. A restraining system for motor vehicles, especially a passive restraining system, with a safety belt and a securing device for the safety belt, comprising a seat belt for restraining a person in a seat of the vehicle, a slider track disposed in the vehicle with one end of said seat belt slideable in the slider track, a movable securing element for locking said one end of the seat belt at the end of the track, spring means with a force sufficient to urge said movable securing element in the path of the belt end in the slider track but of insufficient force to prevent the belt end from sliding into and away from the end of the track, an inertial mass sensor in which the inertial mass is activated at the occurrence of an acceleration or a tilting force which exceeds a predetermined value, said activation being movement of said inertial mass in the direct path of movement of said movable securing element without moving it to block movement of the securing element retaining it in locked position to lock said belt end.

2. Restraining system according to claim 1, wherein said slider track is arranged above the vehicle door.

3. Restraining system according to claim 1, wherein said securing element is constructed in the form of swing lever which is hinged against the force of a spring as said spring means and which lever is provided at one end with a latching hook for locking said one end of the seat belt, and which lever has at the other end a blocking projection which is in direct functional connection with a ball sensor of said inertial mass sensor.

4. Restraining system according to claim 3, wherein said swing lever is two-armed with said blocking projection having a plate-like surface extending above a sensor housing which is open toward the blocking projection, said housing having a hole at approximately its center for the rest position of said sensor ball and is provided with a running surface around said hole on which the sensor ball rolls when the sensor is activated, said ball when on the running surface blocking the plate-like surface of the blocking projection and preventing the lever from swinging out of its normally locked path.

5. Restraining system according to claim 4, wherein said running surface of the ball sensor is substantially horizontal.

6. Restraining system according to claim 1, wherein at said end of the track is a bracket on which are mounted said movable securing element, said spring means and said inertial mass sensor.

7. Restraining system according to claim 6, wherein said bracket has a funnel-like insertion opening for said one end of the belt, and wherein said one end of the belt has a stiff end with a support plate separated by a pin such that when the belt end is inserted in the bracket, the pin is in the opening with the support plate on one side of the bracket and the stiff end on the other side.

* * * * *